April 16, 1929.  E. R. EVANS  1,709,613
REMOTE METERING SYSTEM
Filed Dec. 4, 1924
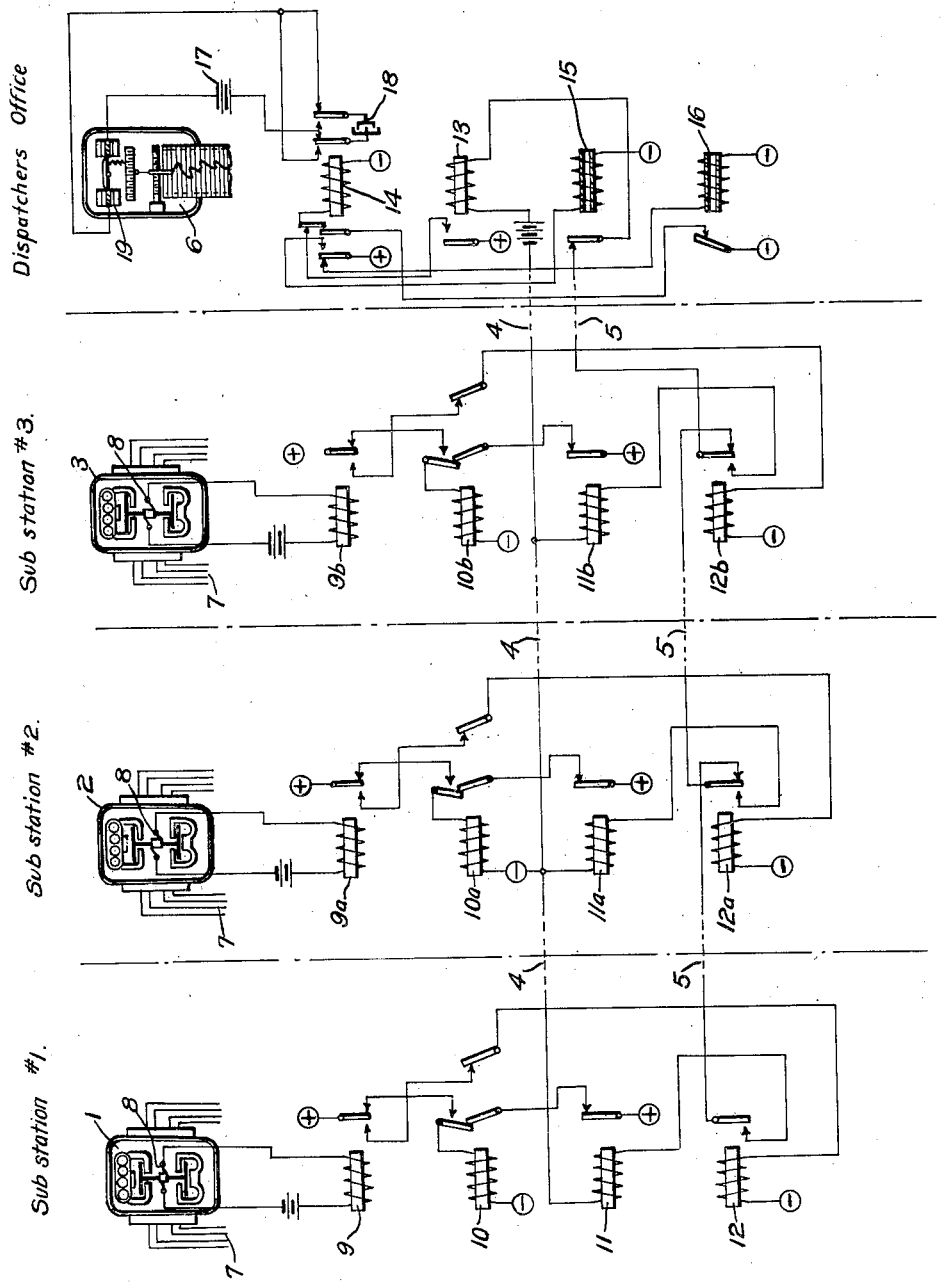
WITNESSES:
A. G. Schiefelbein.
F. H. Miller
INVENTOR
Earl R. Evans.
BY
Wesley G. Carr
ATTORNEY Patented Apr. 16, 1929.

1,709,613

UNITED STATES PATENT OFFICE.

EARL R. EVANS, OF PITTSBURGH, PENNSYLVANIA, ASSIGNOR TO WESTINGHOUSE ELECTRIC AND MANUFACTURING COMPANY, A CORPORATION OF PENNSYLVANIA.

REMOTE METERING SYSTEM.

Application filed December 4, 1924. Serial No. 753,921.

My invention relates to remote metering systems and particularly to remote metering systems of the current impulse type.

One object of my invention is to provide a remote metering system of the current impulse type that shall be adapted to totalize the indications from a plurality of meters over a single circuit.

Another object of my invention is to provide a remote metering system, of the above-mentioned character, that shall have a metering circuit that includes a plurality of locking relays that are energized and re-energized at rates proportional to the quantities being transmitted, and means for unlocking the relays in sequence to prevent interference and for simultaneously actuating a totalizing meter.

Other detailed objects of my invention relate to various features that are illustrated in the accompanying drawing, the single figure of which is a diagrammatic view of a remote metering system embodying my invention.

The metering system comprises a plurality of current-impulse devices 1, 2 and 3 associated with the conductors 4 and 5 of a metering circuit extending to a remote point where a totalizing meter 6 is controlled in accordance with the current impulses transmitted over the metering circuit. The current-impulse devices 1, 2 and 3 are shown as watthour meters of the induction type connected in a circuit 7 to be operated in accordance with the load in said circuit. The watthour meters are each provided with a commutator 8 that is connected to an impulse relay 9, $9^a$ or $9^b$ which operates at a rate proportional to the speed of rotation of the associated watthour meter and therefore proportional to the load in the circuit 7.

The watthour meters 1, 2 and 3 may be located in separate substations of a power distribution system as indicated, and connected in such manner that they will be operated in accordance with the loads on the respective stations. The totalizing meter may be located at a dispatcher's office or other remote point and is controlled by the substation metering devices over the single two-wire circuit. In this way, the necessity for a separate circuit to each substation is avoided.

If it is desired to transmit some other quantity, a current-impulse device is connected to the impulse relay 9 to operate this relay at a rate proportional to such quantity or to a function of the quantity. Each time one of the relays 9, $9^a$ or $9^b$ is energized a current impulse is transmitted over the metering circuit comprising the conductors 4 and 5. Auxiliary relays 10, 11 and 12 are provided for the purpose of preventing interference between the current impulses from the several stations.

At the dispatcher's office, an impulse relay 13 is operated in accordance with the total number of operations of the impulse relays 9, $9^a$ or $9^b$ and actuates the totalizing meter 6 through the instrumentality of a second impulse relay 14. Other auxiliary relays 15 and 16, preferably of the slow-release or copper-clad type, are provided for the purpose of limiting the speed of operation of the impulse relays 13 and 14. A battery 17 and a condenser 18 are connected to the contacts of the impulse relay 14. The winding 19 of the totalizing meter 6 is connected to the battery 17 and the contacts of relay 14 and is operated in accordance with the charging current of the condenser 18, and, therefore, in direct proportion to the rate of operation of the impulse relay 14.

The operation of the system is as follows:

When one of the watthour meters 1, 2 or 3 closes a circuit through its commutator 8, the impulse relay 9, $9^a$ or $9^b$ is operated. Assuming that the relay 9 is energized, a circuit is closed from battery through the front contact of relay 9, the front contact of the normally-energized relay 10 and the winding of relay 12 to battery. Relay 12 becomes energized, whereupon a circuit is closed from battery through the impulse relay 13 at the dispatcher's office, the back contacts of relay 15, the conductor 5, the back contacts of relays $12^b$ and $12^a$ in series, the front contacts of relay 12, the winding of relay 11 and the conductor 4 to battery. Relays 11 and 13 become energized and the former interrupts the locking circuit of relay 10, whereupon this relay becomes deenergized. Upon the deenergization of relay 10, the described circuit of relay 12 is interrupted and this relay becomes de-energized and opens the circuit of relays 11 and 13.

The energization of relay 13 closes a circuit from battery through its front contacts, the normal make-before-break contacts of relay 14 and the winding of relay 14 to battery. Relay 14 becomes energized and closes a circuit through its right hand front contacts for charging the condenser 18 through the winding of the meter 6. The meter 6 is actuated an amount dependent upon the potential of the battery 17 and the capacity of the condenser 18. The relay 14 is locked up through its inner left-hand make-before-break contacts and the front contacts of the normally-energized relay 16. At its outer left-hand back contacts, the relay 14 interrupts the energizing circuit of the slow-release relay 16. This relay becomes de-energized and opens its contacts after a time period that depends upon the adjustment of the relay. At its outer left-hand front contacts, the relay 14 closes an energizing circuit for the slow-release relay 15. This relay becomes energized and opens the metering circuit. The relay 14 is locked up until the relay 16 releases its contacts and cannot be re-energized by the relay 13 until the circuit of the latter relay is re-closed by the release of relay 15. The slow-release relays 15 and 16 therefore cooperate to limit the speed of operation of relay 14 in order to insure that the condenser 18 is fully charged at each operation of the relay 14. Although this is accomplished in a fraction of a second, it is found that the accuracy of the operation is increased by the provision of the slow-acting relays 15 and 16.

If two or more of the watthour meters 1, 2 and 3 close their contacts at the same instant, causing simultaneous energization of the relays 9, 9ª and 9ᵇ, the operation of the relay 12ᵇ interrupts the series circuit through the several stations and causes the relay 10ᵇ to be unlocked first. The de-energization of relay 10ᵇ interrupts the circuit of relay 12ᵇ and this relay recloses the metering circuit through its back contacts to the next station. Assuming that relays 9ª and 12ª are energized, relay 11ª becomes energized and unlocks relay 10ª, whereupon relay 12ª is de-energized and the metering circuit is closed through its back contacts to the next station. In this manner, the current impulses for unlocking the relays 10, 10ª and 10ᵇ and for actuating the totalizing meter 6 are sent in proper sequence regardless of the time or sequence of operation of the impulse relays 9, 9ª and 9ᵇ.

When the impulse relays 9, 9ª and 9ᵇ are de-energized due to the interruption of their circuits at the commutator 8, circuits are closed through the back contacts of these relays and the normal make-before-break contacts of relays 10, 10ª and 10ᵇ, respectively, for energizing these relays. Relays 10, 10ª and 10ᵇ lock up through their front contacts to battery at the relays 11, 11ª and 11ᵇ, respectively, and prepare a circuit through their outer front contacts for operating the relays 12, 12ª and 12ᵇ, respectively.

The watthour meters 1, 2 and 3 are preferably so adjusted that the maximum speed of operation of the impulse relays 13 and 14 at the dispatcher's office is approximately three or four per second. The size of the condenser 18 is such that this operation produces a full scale deflection of the totalizing meter 6. For instance, if the potential of the battery 17 is 50 volts and the capacity of the condenser 18 is about two microfarads, the condenser charging current will operate a standard graphic meter of the Kelvin-balance type as shown.

I do not consider that my invention is limited to the precise arrangement shown and described and therefore I do not wish that it be limited in scope except as may be imposed by the appended claims.

I claim as my invention:

1. In a remote metering system the combination with a totalizing meter and a plurality of watthour meters provided with commutators, of locking relays controlled thereby, and means for unlocking said relays in sequence and for actuating said totalizing meter in accordance with the number of current impulses for unlocking said relays.

2. A remote metering system comprising a totalizing meter, a plurality of locking relays, means for energizing said relays, and means for electrically unlocking said relays in sequence over a single circuit and for actuating said totalizing meter in accordance with the number of current impulses for unlocking said relays.

3. A remote metering system comprising an impulse relay, a condenser and a battery connected to the contacts of said relay, a meter connected to the contacts of said relay to be operated by the condenser charging current, and means in the circuit of the relay for limiting the speed of operation thereof.

4. In a remote metering system a plurality of stations, current-impulse devices therein, a two-wire circuit connecting said stations in series, a totalizing meter connected to said circuit and operated by said current-impulse devices, and means including locking relays associated with said devices for preventing interference between the current impulses transmitted over said circuit.

5. A remote metering system comprising a plurality of meters, a totalizing meter, a metering circuit between the meters and the totalizing meter, an impulsing relay associated with each meter, a set-up relay controlled thereby to complete the metering circuit to introduce an impulse into the metering circuit, a locking relay for establishing the circuit of the set-up relay, a release relay energized by the line impulse current to de-energize the locking relay, and means at the totalizing meter for receiving the impulses and transmitting them to the totalizing meter.

6. A remote metering system comprising a plurality of meters, a totalizing device, a single circuit passing each meter to the totalizing device and means controlled by each meter for closing the circuit to the totalizing device and simultaneously precluding meters more remote from the totalizing device from influencing the totalizing device until the means controlled by a meter to close the circuit is caused to re-open the circuit at that point.

In testimony whereof, I have hereunto subscribed my name this 25th day of November, 1924.

EARL R. EVANS.